US008600990B2

(12) United States Patent
Vermette et al.

(10) Patent No.: US 8,600,990 B2
(45) Date of Patent: *Dec. 3, 2013

(54) INTERACTING METHODS OF DATA EXTRACTION

(75) Inventors: Shane Robert Vermette, San Carlos, CA (US); Vijay Manguluru, Fremont, CA (US); Manoj Kumar, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 539 days.

This patent is subject to a terminal disclaimer.

(21) Appl. No.: 12/059,811

(22) Filed: Mar. 31, 2008

(65) Prior Publication Data

US 2009/0248620 A1 Oct. 1, 2009

(51) Int. Cl.
*G06F 7/00* (2006.01)
*G06F 17/00* (2006.01)
*G06F 17/30* (2006.01)

(52) U.S. Cl.
USPC .......................... 707/736; 707/770; 707/796

(58) Field of Classification Search
USPC .................................. 705/3; 726/26; 712/38
See application file for complete search history.

(56) References Cited

U.S. PATENT DOCUMENTS

| | | | |
|---|---|---|---|
| 6,119,222 A * | 9/2000 | Shiell et al. | 712/238 |
| 6,161,105 A * | 12/2000 | Keighan et al. | 1/1 |
| 6,513,065 B1 | 1/2003 | Hafez et al. | |
| 6,560,647 B1 | 5/2003 | Hafez et al. | |
| 6,748,384 B1 | 6/2004 | Rylander et al. | |
| 6,856,970 B1 * | 2/2005 | Campbell et al. | 705/35 |
| 6,978,265 B2 | 12/2005 | Schumacher | |
| 6,988,271 B2 | 1/2006 | Hunt | |
| 7,281,013 B2 * | 10/2007 | Chaudhuri et al. | 707/602 |
| 7,454,698 B2 | 11/2008 | Kohda et al. | |
| 7,509,684 B2 * | 3/2009 | McDonald et al. | 726/26 |
| 7,958,083 B2 | 6/2011 | Vermette et al. | |
| 7,979,385 B2 | 7/2011 | Vermette et al. | |
| 8,046,779 B2 | 10/2011 | Wusthoff et al. | |
| 2003/0163790 A1 | 8/2003 | Murata | |
| 2005/0066095 A1 | 3/2005 | Mullick et al. | |
| 2005/0262057 A1 | 11/2005 | Lesh et al. | |
| 2008/0300872 A1 | 12/2008 | Basu et al. | |

(Continued)

OTHER PUBLICATIONS

U.S. Appl. No. 12/059,830, filed Mar. 31, 2008, Office Action mailed Aug. 24, 2010, 20 pages.

(Continued)

*Primary Examiner* — Susan Chen
(74) *Attorney, Agent, or Firm* — Kilpatrick Townsend & Stockton LLP

(57) ABSTRACT

Extraction methods can interact on a common data source using identifiers that correspond to events or other actions. These identifiers can be updated, whenever appropriate, once the corresponding data has been summarized, in order to provide for multiple extraction methods to operate only on the data of interest, and obtain a lock only on the data within the scope of extraction. High water marks, such as identifiers in the sequent, can be used to further designate which data has previously been extracted. Similarly, summarization methods can interact by utilizing corresponding persistent tables in the flows for the methods, but utilizing separate intermediate tables to allow for data transformations and application of various business rules and tuning techniques. The ability to switch between different methods can accommodate business, performance, or other such needs, and can provide for the dynamic extraction and summarization of different volumes of data.

15 Claims, 15 Drawing Sheets

(56) References Cited

U.S. PATENT DOCUMENTS

| | | |
|---|---|---|
| 2009/0248691 A1 | 10/2009 | Vermette |
| 2009/0276527 A1 | 11/2009 | McClain et al. |
| 2009/0303901 A1 | 12/2009 | Duffield et al. |
| 2009/0327290 A1 | 12/2009 | Vermette |
| 2009/0328043 A1 | 12/2009 | Vermette |

OTHER PUBLICATIONS

U.S. Appl. No. 12/059,830, filed Mar. 31, 2008, Final Office Action mailed Nov. 24, 2010, 12 pages.

U.S. Appl. No. 12/147,709, filed Jun. 27, 2008, Office Action mailed Dec. 16, 2010, 9 pages.

U.S. Appl. No. 12/059,830, filed Mar. 31, 2008, Advisory Action mailed Jan. 21, 2011, 2 pages.

U.S. Appl. No. 12/059,830, filed Mar. 31, 2008, Notice of Allowance mailed Mar. 17, 2011, 10 pages.

U.S. Appl. No. 12/147,709, filed Jun. 27, 2008, Notice of Allowance mailed Mar. 22, 2011, 14 pages.

U.S. Appl. No. 12/147,726, filed Jun. 27, 2008, Office Action mailed Aug. 14, 2012, 12 pages.

Endress, W., "On-line Analytic Processing with Oracle Database 11g Release 2," An Oracle White Paper, Sep. 2009, 34 pages.

Rosenberg, Deborah, "Methods for Summarizing Data," Analytic Methods in Maternal and Child Health, University of Illinois at Chicago, 1998, 37 pages.

Tanin, E., "Hierarchical Data Summarization," University of Melbourne, 2008, 6 pages.

U.S. Appl. No. 12/147,726, filed Jun. 27, 2008, Notice of Allowance mailed Nov. 26, 2012, 11 pages.

U.S. Appl. No. 13/398,301, filed Feb. 16, 2012, Non-Final Office Action mailed Feb. 4, 2013, 6 pages.

\* cited by examiner

INTERACTING METHODS OF DATA EXTRACTION

CROSS-REFERENCES TO RELATED APPLICATIONS

This application is related to U.S. patent application Ser. No. 12/059,830, filed Mar. 31, 2008, and entitled "INTERACTING METHODS OF DATA SUMMARIZATION,", filed concurrently herewith, which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to extracting and summarizing data, and in particular to allowing different extraction, summarization, or other such methods to interact while operating on the same data source.

Presently, many problems are met when extracting and/or summarizing data. For example, multiple extraction methods currently exist, but each extraction method has its own limitations. For instance, one extraction method may perform well with a small volume of data but may perform poorly with a large volume of data. Alternatively, a second extraction method may perform well with a large volume of data but may perform poorly with a small volume of data. Examples of such extraction solutions are discussed below.

In one previous solution called logging, when data in a table is updated or inserted, entries to a log are added. Such log entries may then be extracted and reported on as desired. However, such a process requires the joining of a potentially large data source with a log table that may also grow large. Therefore, the logging solution does not perform well for high volume extractions.

In a solution similar to the logging solution, a solution called event-based logging may create an entry which has additional information beyond which row has been updated or inserted. This entry may contain functional information that allows the entry to be identified and individually processed. However, for similar reasons as the logging solution, the event-based solution does not perform well for high volume extractions.

In another solution called flagging, a flag is used to mark areas of a data source, the flag identifies the data that has not been previously extracted. In some cases, the flag may take on a value of 'N' if the data has not been extracted and is updated to "null" when the data is extracted. However, because of the limitations of a flag, the flag needed to be updated to a value of null immediately or else the incremental context was lost. Furthermore, when only a small portion of the data is functionally required for extraction, using information other than the flag may be required since the flag could be set to 'N' for a much larger data set than required.

In yet another solution, rather than actually extracting the data, a view is defined that takes the place of a summarization program. However, such a view may quickly become intractable in a summarization solution. Further, this solution does not perform well with larger amounts of data since it forces all of the data to be summarized on every extraction. Moreover, using a view precludes other beneficial aspects of a summarization program, such as the recoverability of extraction work that has already been completed.

In a solution similar to the viewing solution, a solution without incremental logic makes it possible to extract all the data every time the summarization program is run. However, in addition to the problems that the first viewing solution has, this second viewing solution has the added overhead of clearing the data from wherever the summarization program finally leaves the summarized data.

Previously, different solutions such as the ones described above could not operate on the same source of data reliably. Attempting to utilize multiple solutions on the same source of data risked the corruption of the data. As such, developers were forced to design custom solutions targeted to specific scenarios with little flexibility or scalability. Developers' resources were consumed as they developed these custom solutions while customers' costs increased. Customers were forced to use only one solution, and such a single solution was not always the most efficient solution for all of their possible scenarios.

In another previous solution employing hybrid flow with persistent incremental tables, there is typically a single summarization flow that diverges in locations that require different types of tuning to optimize for bulk and incremental summarization methods. This approach tends to be implemented after a summarization flow is designed and during advanced coding stages and even implementation, when various portions of the flow need to be tuned differently for bulk and incremental data volumes. Without a meaningful separation of the bulk and incremental methods and an architectural way of fixing the data to ensure better performance, this approach can cause the data in the persistent tables to become fragmented over time.

In another solution using index-organized tables, index-organized tables automatically maintain the physical placement of data in the table to minimize fragmentation. However, persisting data in these tables with frequent high volume updates results in undesirable end-user overhead due to the automatic maintenance of the data in the tables.

In yet another solution, it is necessary to periodically execute data maintenance manually in order to improve the summarization methods' performance. This typically requires more support from a development team than if a deferring and scheduling method were to exist.

In still another solution, it is possible to use a single code-path for all methods of summarization. However, this architecture does not have the flexibility to be optimized for both bulk and incremental methods when the tuning techniques differ between the two data volumes, and therefore the solution does not scale well.

Previously, different solutions such as the ones described above could not operate on the same source of data reliably. Attempting to utilize multiple solutions on the same source of data risked corruption of the data. As such, users are forced to use only one solution, and this single solution was not always the most efficient solution for certain scenarios. Further, developers and customers are increasingly seeking solutions that are more cost-effective, customizable, maintainable, and robust while data sources and customers' needs continue to become more complicated. Therefore, an improved data extraction approach and an improved data summarization approach are desirable.

BRIEF SUMMARY OF THE INVENTION

Systems and methods in accordance with various embodiments of the present invention can overcome these and other deficiencies in existing approaches to extracting and/or summarizing data.

In various embodiments, a method for extracting data from a source table includes determining a scope of extraction in response to receiving a request to extract data from the source table, the scope of extraction including a set of the summary identifiers in the source table, each summary identifier corresponding to a data event and being included in at least one of a record for the data event or context for the data event. A lock on data in the source table within the scope of extraction is obtained. The data from the source table within the scope of extraction is extracted. When appropriate, the summary identifier for each record of extracted data is set to a predetermined value indicating that the record has been extracted.

In some embodiments, the predetermined value may be a null value. Such a method may further include determining an extraction method based at least in part upon the scope of extraction. The extraction method may be selected from the group consisting of bulk methods, incremental methods, online methods, and re-extraction methods. The method may further include recording a high water mark indicating which records of data have previously been extracted. The summary identifier for each record may be an integer or a null value and the high water mark may be a next integer value in sequence from a last extracted summary identifier. The method may further include storing information for each data event in an event table. The method may further include summarizing the extracted data. The method may further include deleting, when appropriate, an event from the event table when data in the source table that corresponds to the event is summarized. The method may further include marking an event in the event table when data in the source table that corresponds to the event is summarized. The method may further include allowing at least one additional extraction method to obtain a lock on data in the source table within a separate, non-overlapping scope of extraction.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Figure 1:
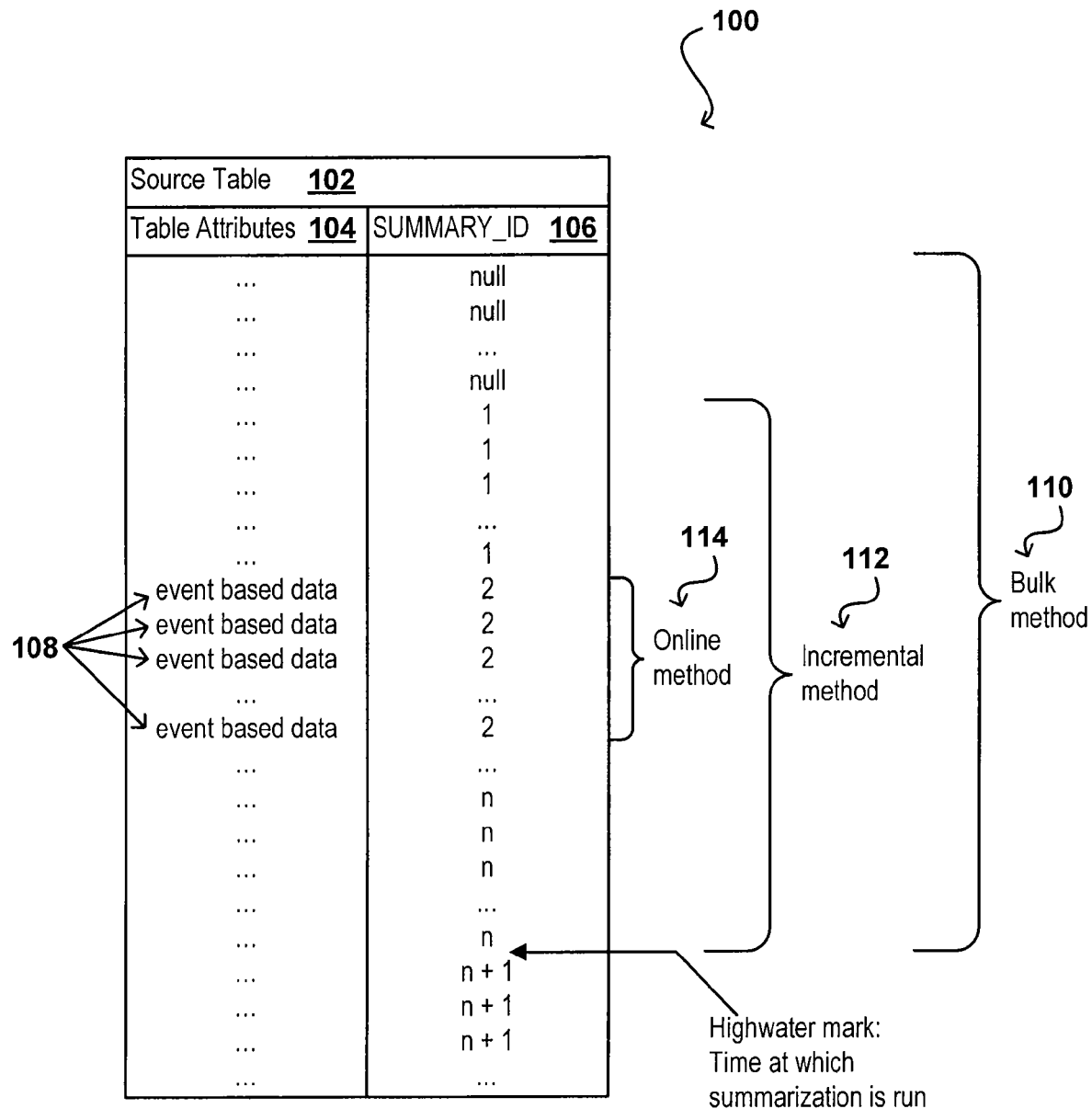
FIG. 1 illustrates an exemplary method for extracting data that can be used in accordance with one embodiment of the present invention.

Systems and methods in accordance with various embodiments overcome the aforementioned and other deficiencies in existing approaches to data management and/or analysis. Embodiments of the present invention allow for bulk, incremental, and/or events based extraction and/or summarization of a common data source, for example, which can allow for switching between different methods to accommodate business, performance, or other such needs, and can provide for the dynamic extraction of different volumes of data, among various other advantages. Embodiments also can allow developers to present a scalable extraction and/or summarization solution with an efficient configurable extraction mechanism.
Data Extraction:

FIG. 1 illustrates the interaction 100 of multiple extraction methods on a single source table 102 that can be used in accordance with one embodiment. The single source may be any table or combination of tables, the data from which may be extracted and summarized using any of the various approaches set forth herein. As illustrated in FIG. 1, a source of data for extraction may be a source table containing a table attributes column 104 in which attributes corresponding to specific data may be stored. In some embodiments, the table attributes include event-based data 108. The source table may also contain a column such as SUMMARY_ID 106. Each SUMMARY_ID can correspond to data for a particular event. It should be understood that these column names are merely exemplary, and that many other names could be used for this and other purposes as would be understood to one of ordinary skill in the art in light of the teachings and suggestions contained herein. For the purposes of describing embodiments of the present invention, the SUMMARY_ID 106 may have a value of null or any positive integer. When a system or application has new data, such as cost or revenue data corresponding to a particular event, it can be desirable to store this data in a way that can be tied to the event. Further, the application might require the cost data summarized, either alone or with other data. Accordingly, the application can acquire a SUMMARY_ID to be used to mark the cost data, such that only the relevant cost data will be used for a relevant summarization procedure, such as an online extraction method. Here, the online method is shown using only a small portion of the data that is identified by a common SUMMARY_ID.

A SUMMARY_ID 106 thus can be used to identify data for a particular event, to determine the extraction history of specific data (which should be extracted for a given method), determine how the data should be extracted, etc. For example, a SUMMARY_ID 106 for certain data may be set to a value of null after the data has been extracted, while a second SUMMARY_ID 106 for a different set of data which has not been extracted may be set to a specific positive integer value. The data also may be identified in different manners. In some embodiments, the SUMMARY_ID 106 may be in a table that actually contains the data to be extracted, and in some cases the SUMMARY_ID 106 may be in a table that defines a context for the data to be extracted.

Different extraction methods are able to operate in conjunction with one another, and can utilize the SUMMARY_IDs in different ways. For example, a bulk extraction method 110 can be used, in which a large volume of data is extracted, which can include previously extracted data. An incremental extraction method 112, on the other hand, might extract only data created since the last extraction. As discussed above, this can be indicated by any non-null SUMMARY_ID, for example. Incremental context thus can be maintained such that any data needing to be summarized is identified by a non-null ID. Further, a method such as an online extraction method 114 can be used, in which data for a specific SUMMARY_ID (or multiple specific IDs) is extracted using an event model as discussed elsewhere herein.

Utilizing SUMMARY_IDs in such a way allows the various methods to work on the same source, or "interact," so that each method can be run on the data without causing corruption of the data or problems for the other methods. After a summarization, the IDs for the summarized data can be set to null, and the IDs can start over (or continue from the previous count). The various methods can all run on the same system in one embodiment, with rules being defined that allow the methods to interact with each other accordingly.

Additional extraction methods may be implemented in a similar fashion. For instance, a re-extraction method might extract only data that has previously been extracted, as might be indicated by null SUMMARY_IDs. Such a method might be useful, for example, in the case of data corruption of a source or in the case of various bug-fixing scenarios. Other extraction methods may also be implemented. Further, such additional extraction methods may be implemented in concert with the bulk 110, incremental 112, and/or online extraction methods 114.

Figure 2:
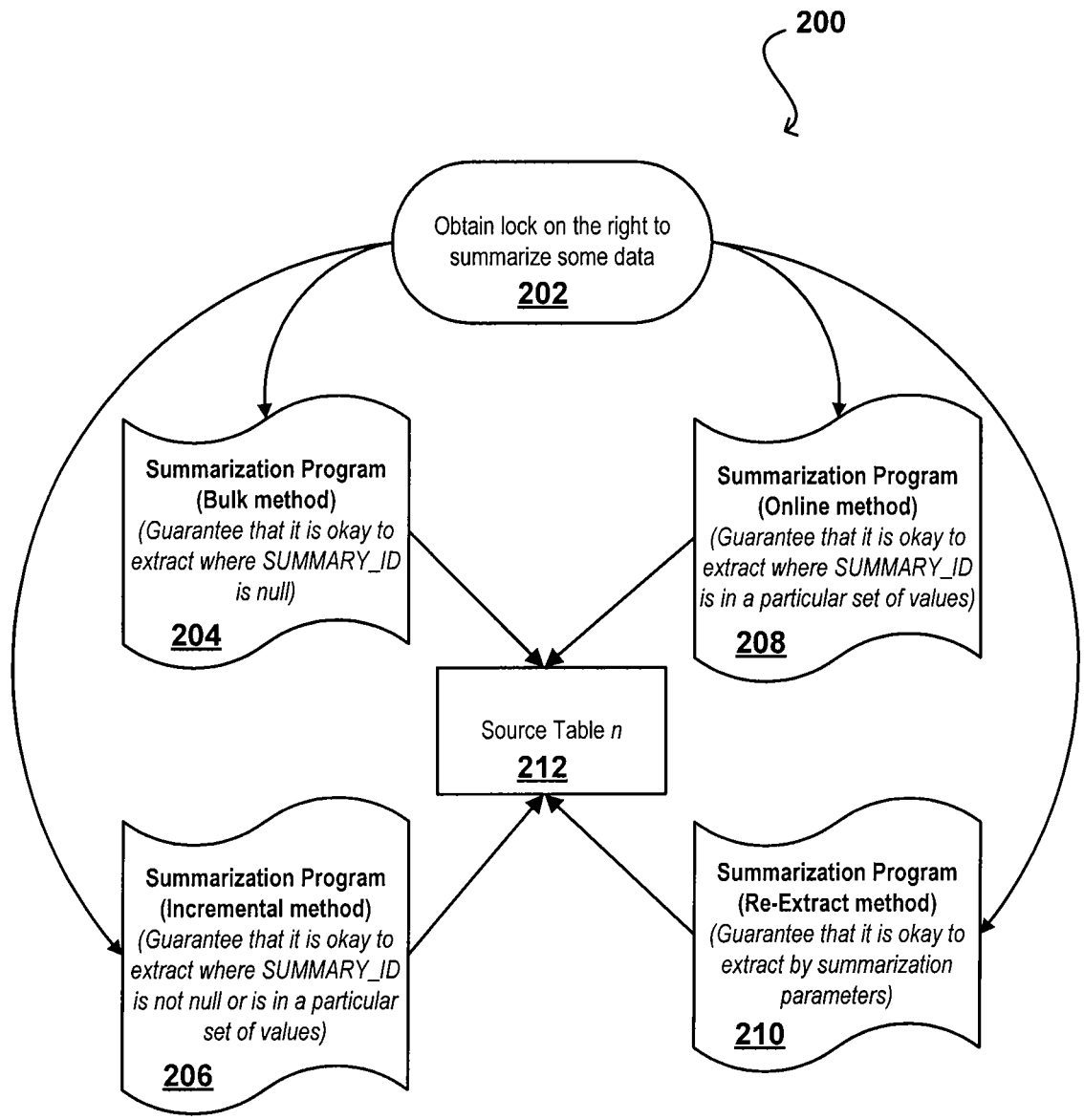
FIG. 2 illustrates an exemplary method for extracting data that can be used in accordance with one embodiment of the present invention.

FIG. 2 illustrates an exemplary overview 200 of the interaction of various methods with respect to a single source table 212 in accordance with one embodiment. As illustrated in FIG. 2, two extraction methods, and more strictly two different runs of a summarization program, may not concurrently operate on the same row of data in the source table 212. Thus, a summarization program or other such application in this embodiment first obtains a lock on the right to summarize at least some of the data 202. This lock can be obtained using any appropriate locking mechanism known in the art for such purposes.

Typically, factors that may dictate the extraction method used for data extraction include system resources and/or business needs. Limited system resources could cause a restriction on the volume of data that can be summarized. Such a restriction could result in the use of an online extraction method 208, or the use of frequent incremental summarization runs. In contrast, a business need may require minimal usage of resources at certain times (for example, when users are on the system) and then to summarize all data during off hours. Such a business need would likely cause a need for a bulk summarization extraction method 204, or at least an incremental extraction method 206, and less frequent or periodic incremental summarization runs. Many other business needs exist that would require various configurations of data extraction.

For the various extraction methods to work in conjunction with one another, an approach in accordance with one embodiment guarantees that the methods can extract data in their own way without interfering with the other methods. For example, the bulk extraction method 204 can guarantee that the method is able to extract data where SUMMARY_ID is null and/or in a particular set of values, the incremental extraction method 206 is able to guarantee that it may extract data where SUMMARY_ID is not null and/or in a particular set of values, the online extraction method 208 is able to guarantee that it may extract data where SUMMARY_ID is in a particular set of values, and the re-extract extraction method 210 is able to guarantee that it can extract data by any of a number of appropriate summarization parameters. A summarization parameter in one embodiment is a parameter submitted to a summarization program either by a call from an OLTP flow (a process that populates data that will be extracted and summarized by the summarization program) or by a user submitted or user scheduled call to the summarization program. Summarization parameters can also define a particular set of SUMMARY_ID values for use by the summarization methods. Additional extraction methods could similarly guarantee the ability to extract data in their own way.

Various embodiments can take advantage of a high-water mark. When data is extracted according to any appropriate method, a high-water mark can be stored which indicates the most recent extraction point in the data source. Subsequently, when new data is added to the source, this newly added data will be beyond the high water mark. Hence, an extraction method may utilize the high water mark to determine what data has been and/or has not been previously extracted. Such an approach includes the ability to determine data that has been previously summarized while also indicating which data has been previously extracted for any appropriate purpose. In a situation in which a SUMMARY_ID is acquired but the SUMMARY_ID's corresponding data was not added to the source before the high-water mark was taken and processed, various embodiments will ensure that the data is not corrupted.

In determining a high-water mark, a sequence or autonomous object can be used that returns the next largest integer each time the object is accessed. For example, a summarization sequence such as SUMMARY_ID_S can be used that obtains the maximum possible value for all events that have been submitted as of the time the high water mark is determined. Simply getting the next value in the sequence may accomplish this task. As can be seen, then, a bulk method can summarize all data up to the high-water mark, for example (see FIG. 1). In FIG. 1, the high-water mark is designated by the variable n. In this case, the next SUMMARY_ID would then be n+1, or the next incremental integer.

Figure 3:
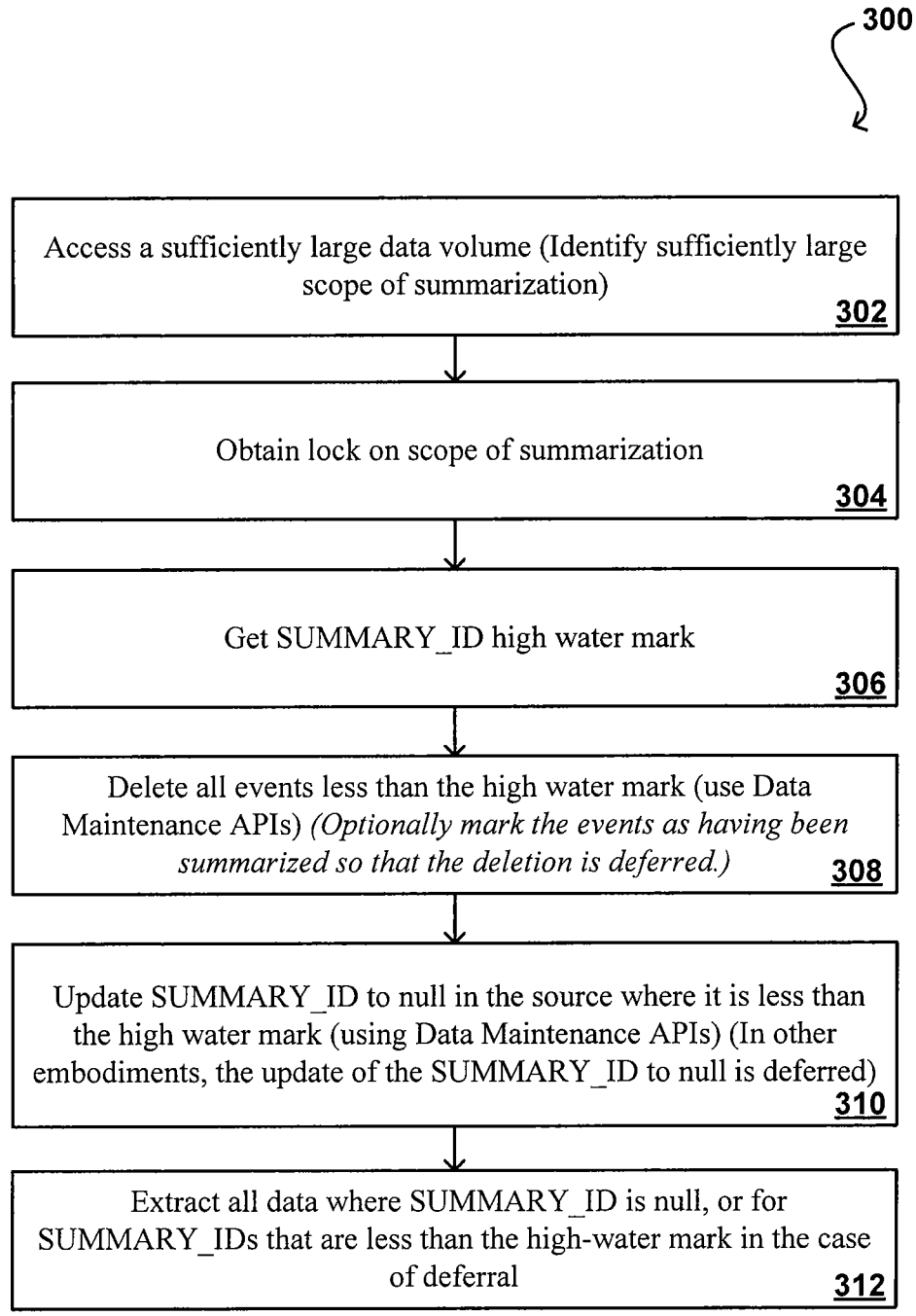
FIGS. 3, 4(a), 4(b), 5, and 6 illustrate exemplary interacting methods for extracting data that can be used in accordance with one embodiment of the present invention.

FIGS. 3-6 illustrate examples of extraction methods that can interact on a single data source. For example, FIG. 3 illustrates steps of an extraction method 300 wherein a sufficiently large data volume is accessed 302 and the method obtains a lock on the scope of summarization (i.e., the context of the records or entries to be summarized) 304. If provided and appropriate, the method can obtain the appropriate high-water mark 306. In some embodiments, events less than the high-water mark may be deleted 308, although in other embodiments the events may be marked as being summarized so that the deletion is deferred. The SUMMARY_ID for each record that falls "under" or "below" the high-water mark is set to null in the source, indicating that the record has been summarized 310, although in other embodiments, the update of the SUMMARY_ID to null may be deferred. For example, this may be accomplished by using data maintenance APIs. The data then can be extracted where SUMMARY_ID is null 312, or for SUMMARY_IDs that are less than the high-water mark in the case of deferral. Various embodiments also allow the use of summarization parameters to limit the scope of summarization provided that the necessity of joining the data to be extracted with other tables is minimized (e.g. if the summarization parameters can operate on attributes of the data source itself).

Figure 4A:
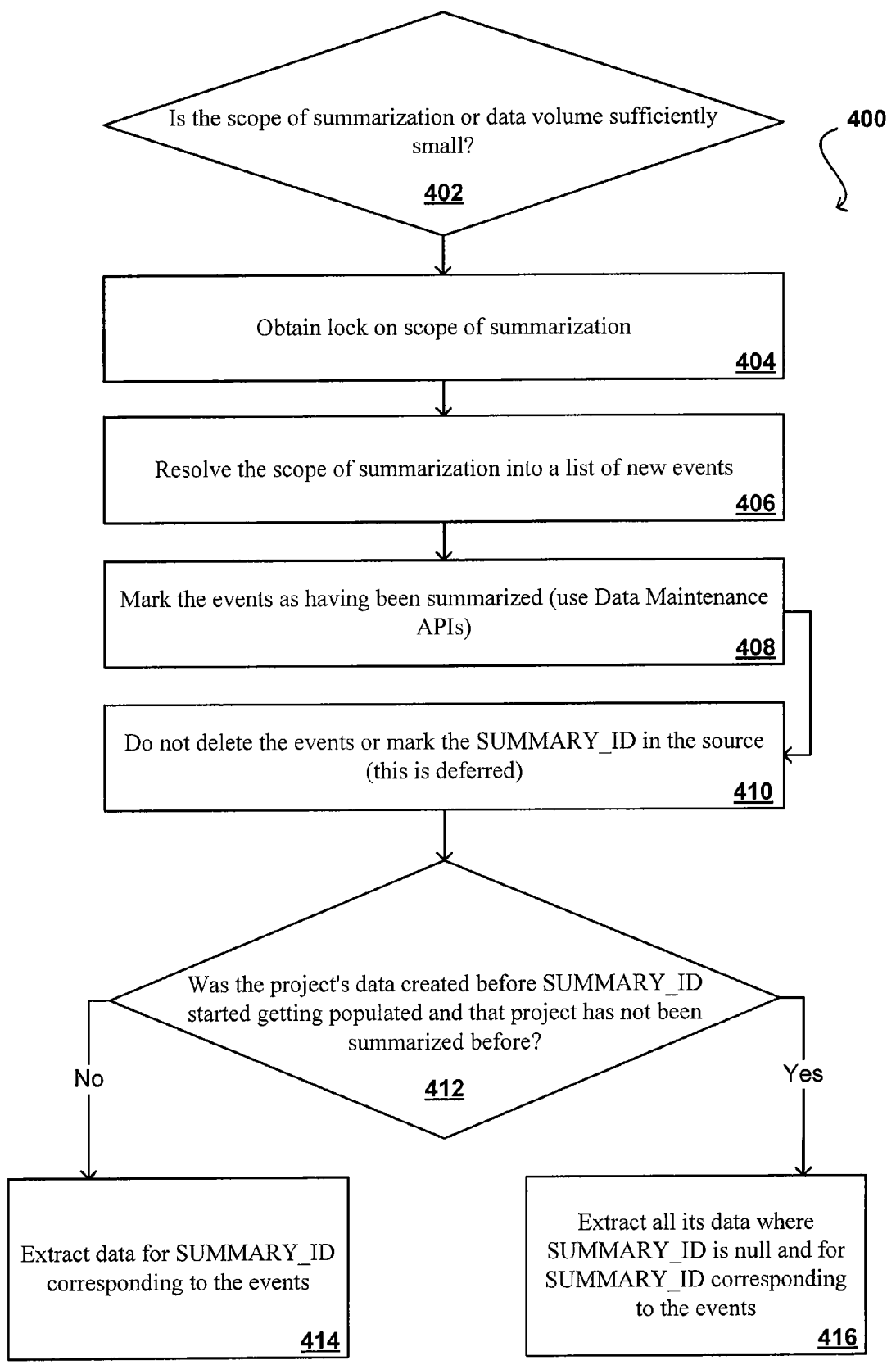
Figure 4B:
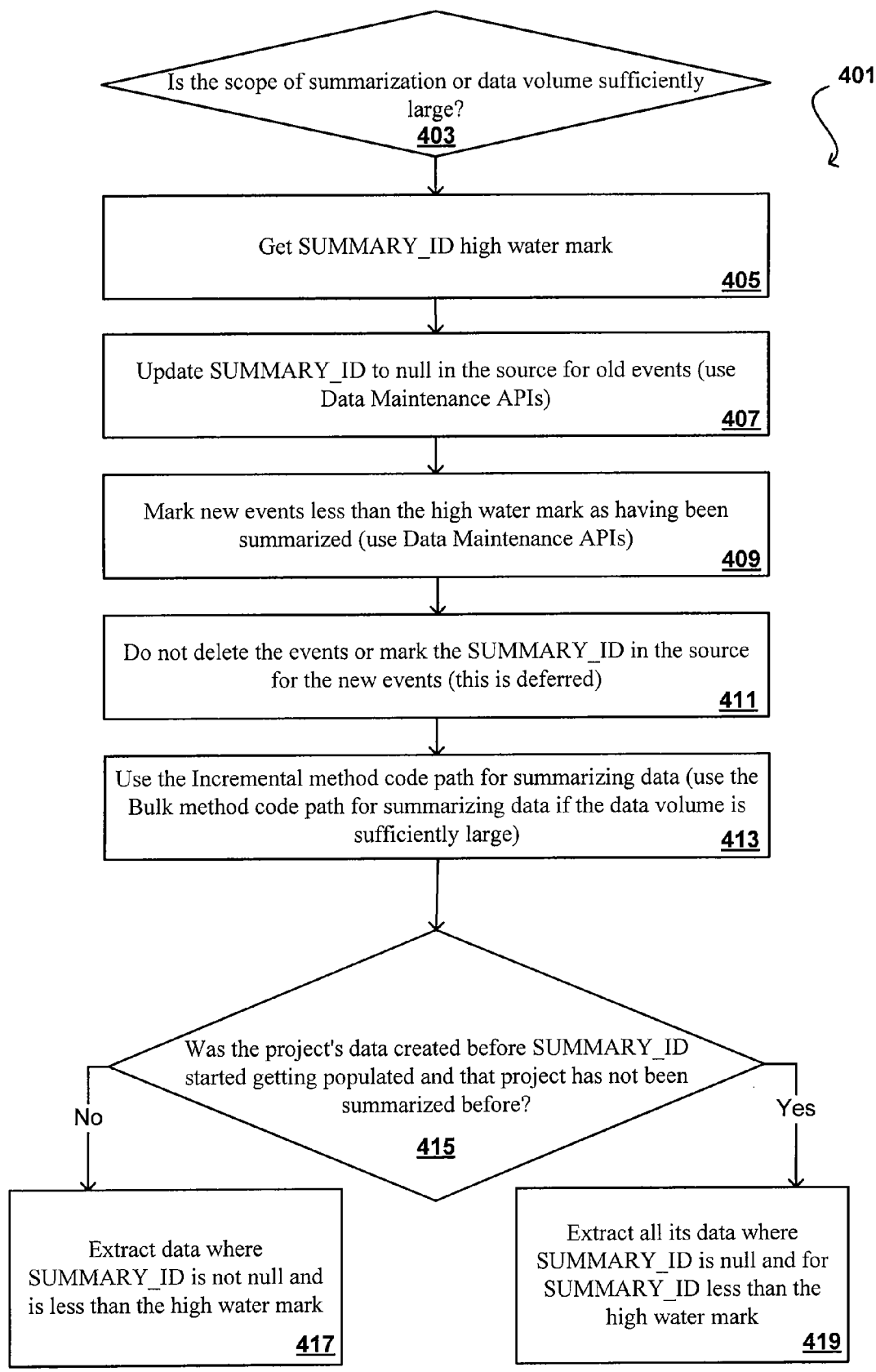

FIGS. 4(a) and (b) illustrate an example of a method 400 that can be used in accordance with one embodiment. In this example, a determination is made as to whether the scope of summarization or data volume is sufficiently small 402, and if so a lock is obtained on the scope of summarization 404 as discussed above. The scope of summarization is resolved into a list of new events 406, which can be marked as having been summarized 408. The events are not deleted nor the SUMMARY_IDs marked in the source, as here this is deferred 410. A determination is made as to whether the project data was created before the SUMMARY_ID started being populated, as well as whether the project has been summarized before 412. Based on the determination, either the data is extracted for SUMMARY_IDs corresponding to the events 414 or for data where the SUMMARY_ID is null as well as corresponding to the events 416.

As another part of the interacting methods 401, where high water marks may be used, a determination is made as to whether the scope of summarization or data volume is sufficiently large 403, and if so a high-water mark is obtained 405 as discussed above. The SUMMARY_IDs can be updated to null in the source for old events 407, and new events less than the high-water mark can be marked as having been summarized 409. The events are not deleted nor the SUMMARY_IDs in the source for the new events marked, as this is deferred 411. The incremental method code path is used to summarize the data, or the bulk method code path is used if the data volume is sufficiently large 413. A determination is made as to whether the project data was created before the SUMMARY_ID started being populated, as well as whether the project has been summarized before 415. Based on the determination, either the data is extracted for SUMMARY_IDs that are not null and are less than the high-water mark 417, or for data where the SUMMARY_ID is null as well as less than the high-water mark 419. In one embodiment, the new events may be used to identify SUMMARY_IDs to extract so that the update of the SUMMARY_IDs corresponding to the old events does not need to take place and can continue to be deferred.

Figure 5:
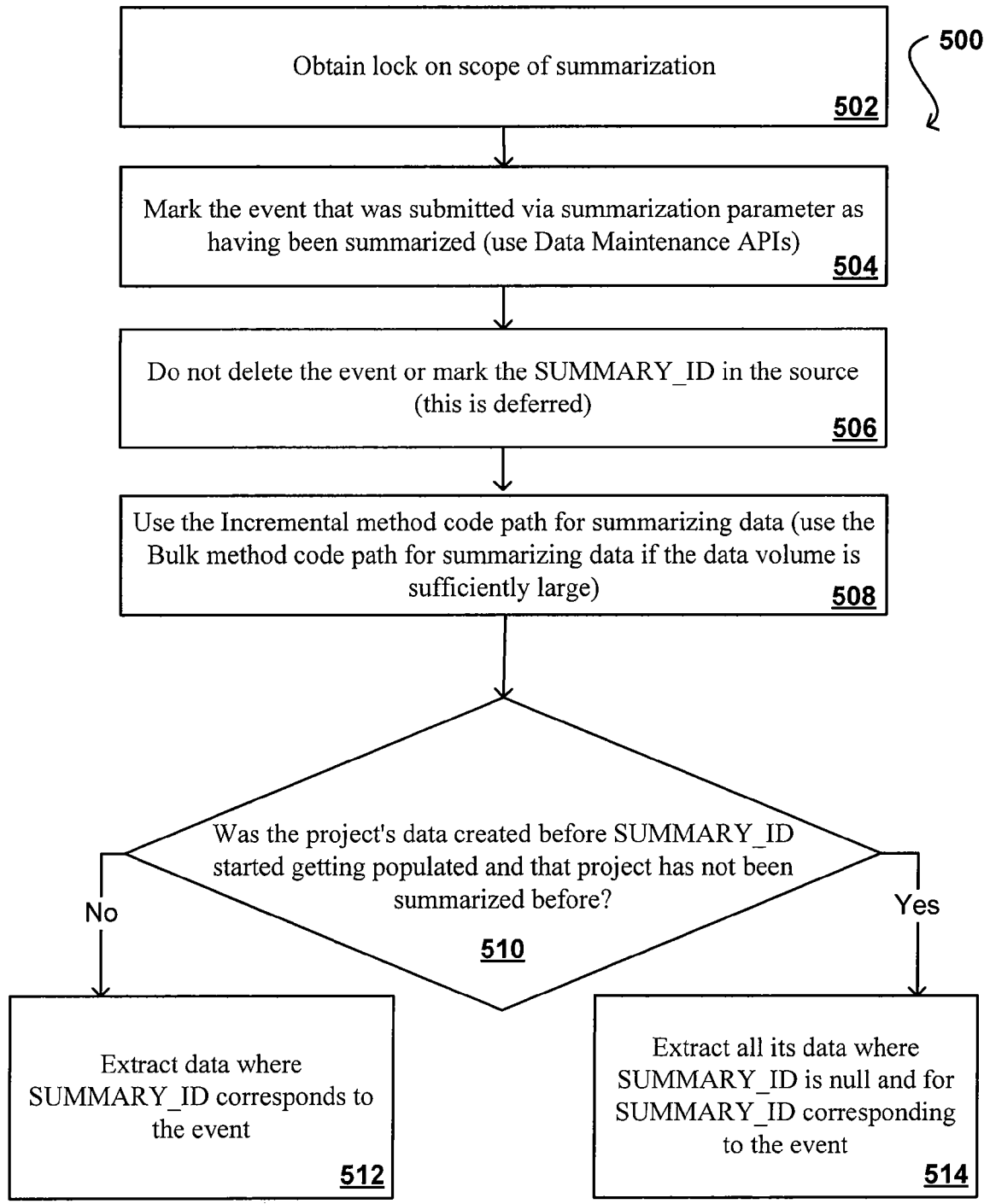

FIG. 5 illustrates an example of an extraction method 500 (applying to data for a single event) that can be used in accordance with one embodiment. In this example, a lock is obtained on the scope of summarization 502 as discussed above. The event that was submitted via a summarization parameter is marked 504 as having been summarized. The event is not deleted nor the SUMMARY_ID in the source marked, as this is deferred 506. An online or incremental method code path can be used for summarizing data, or a bulk method code path can be used if the data volume is sufficiently large 508. A determination is made as to whether the project data was created before the SUMMARY_ID started being populated, as well as whether the project has been summarized before 510. Based on the determination, either the data is extracted where the SUMMARY_IDs corresponding to the event 512 or for data where the SUMMARY_ID is null as well as corresponding to the event 514. Extracting data where SUMMARY_ID is null can be optional in this method, since it may be a business need to, in no case, extract more data in an online method than is explicitly scoped by the event. In this case, the methods would distinguish which method has previously summarized a project when determining whether to extract all data for the project, and not consider a previous run of the online method as an indicator that all the project's data has been previously summarized. In some embodiments, the method in FIG. 5 can only extract data where SUMMARY_ID corresponds to the appropriate events. Then the method in FIG. 3 will only extract a project that has never been extracted before. This way, the summarization program can be run in such a way as to allow the user to run small online methods before ever running the bulk method in order to begin running with new data quickly. The bulk method could purge existing data that had been previously summarized by the online method.

Figure 6:
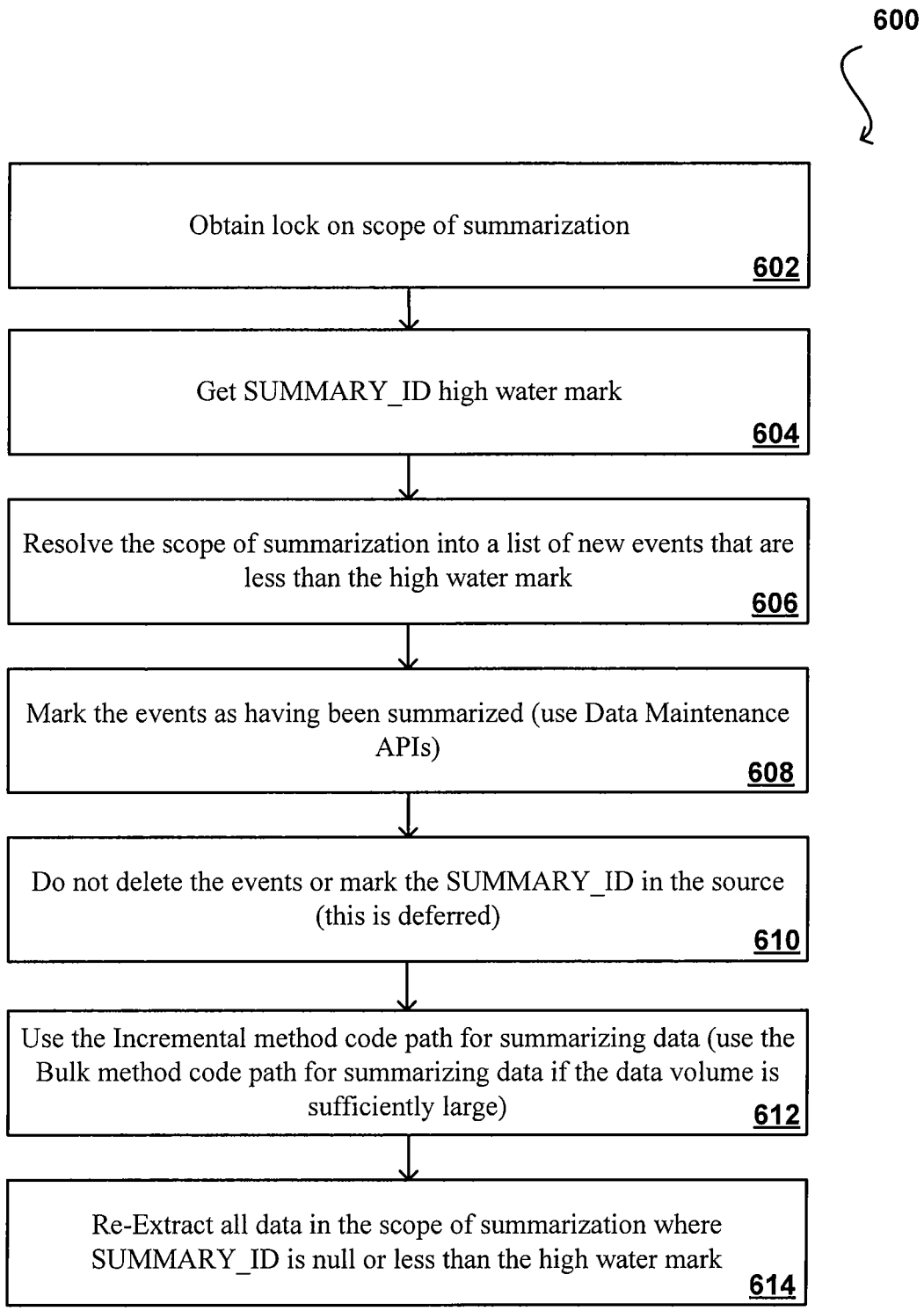

FIG. 6 illustrates an example of an extraction method 600 that can be used in accordance with an embodiment where high-water marks are used. A lock is obtained on the scope of summarization 602, and a high-water mark is obtained 604 as discussed above. The scope of summarization is resolved into a list of new events that are less than the high water mark 606, and the events are marked as having been summarized 608. The events are not deleted nor the SUMMARY_IDs in the source marked, as this is deferred 610. The incremental method code path is used to summarize the data, or the bulk method code path is used if the data volume is sufficiently large 612. All data in the scope of summarization are re-extracted where the SUMMARY_ID is null or less than the high water mark 614.

Figure 7:
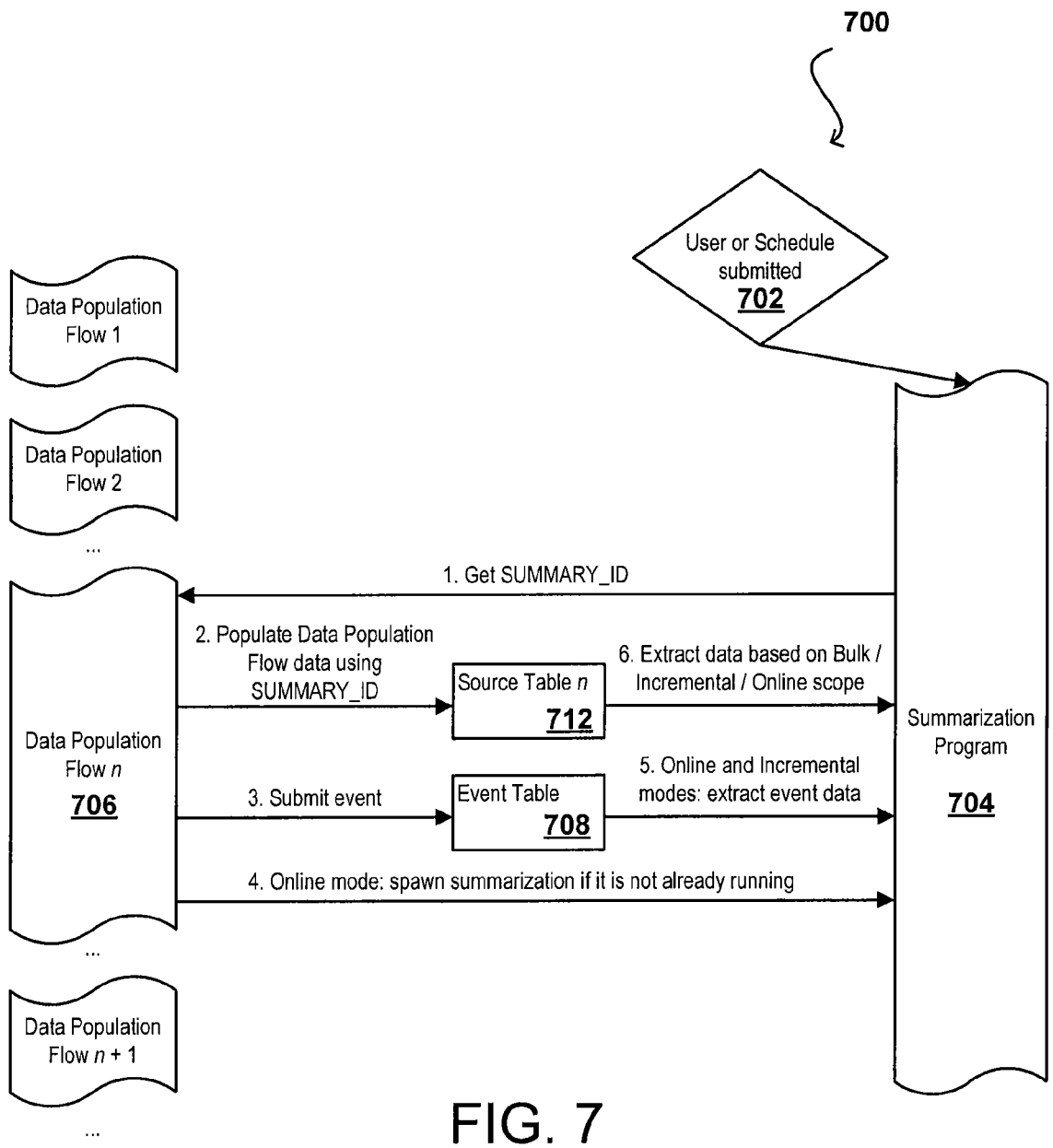
FIG. 7 illustrates an exemplary method for extracting data that can be used in accordance with one embodiment of the present invention.

FIG. 7 illustrates an exemplary flow 700 between data population flows 706 and a summarization program 704 that can contain various extraction methods. The data may be extracted and summarized according to a user or scheduled submission 702 by a summarization program, which may take the form of what may be called a concurrent request as described herein or may take any of the forms described by the previous solutions as described herein. In the source as indicated in FIG. 7, various flows 706 may be inserting and updating data, updating data in the source table 712 and creating or updating entries in a corresponding event table 708 for each event. Each flow that updates or inserts data to be summarized obtains a SUMMARY_ID from the summarization program 704 and uses that SUMMARY_ID to mark and store the data in the source, and to submit event data to the event table. The source flow then may, based on user configuration, spawn the online extraction method of summarization or allow the data to be picked up by another run of the summarization program using appropriate methods as discussed elsewhere herein. This interaction in one embodiment is achieved using the following two Application Programming Interfaces (APIs).

GET_SUMMARY_ID (which API returns the next value in the sequence used for generating SUMMARY_IDs, say SUMMARY_ID_S), and SPAWN_SUMMARIZATION (which logs an event for the SUMMARY_ID and optionally spawns the summarization program for the online extraction method)

Events can be logged by the source system using the above APIs and may be assigned priority. Events may be combined and be processed together. The priority may affect when and by which extraction method an event may be processed, as well as whether the event may be combined with other events or runs of the summarization program. Any efficient queuing system known in the art may fill this role.

In order to preserve the incremental context in the source system, the SUMMARY_ID may be updated to null. However, the SUMMARY_ID in the source system may be updated when appropriate, such as immediately, at a deferred time, or some point in the future, so that summarization runs do not need to wait for its completion. The caller of the summarization program (whether a user or a user defined schedule) will not need to wait as long for the process to finish since the update is deferred. The events may be marked as they are summarized and the deletion of these events may also be deferred to reduce the wait time for the user.

This update of SUMMARY_ID and deletion of summarized events may be performed by a user submitted or user scheduled data maintenance program, which, among other tasks, may perform these updates and deletions. This data maintenance program may also make available the data maintenance APIs. As indicated herein, the data maintenance program and the extraction methods are designed in such a way that they may be out of synchronization and will still not interfere with the integrity of the extraction methods.

Since the data extraction methods work in conjunction with one another, the implementer of the summarization program is free to configure the extraction methods to suit individual business needs. Configurability can be controlled in the flows that spawn the summarization process. A user may choose which flows should spawn the online extraction method of summarization. Since the bulk and incremental flows are user or schedule submitted, full configurability between the extraction methods is possible.

Data Summarization:

Various embodiments also allow bulk and multiple incremental summarization methods to run in parallel and allow for switching between the different methods of summarization to accommodate different volumes of data. Embodiments also can allow for an ordering of data in persistent tables to minimize fragmentation, as well as periodic re-ordering, the additional time for which is not seen by the end-user. Embodiments also can allow unique bulk and incremental performance tuning techniques to be applied to all parts of the summarization methods, and allow for portions of the summarization flow to be deferred such that the wait time for the end user is reduced. Embodiments also can allow a developer to present a scalable solution with a versatile summarization mechanism.

The different summarization methods may include, for example, a bulk summarization method in which a sufficiently large volume of the data is summarized, an incremental summarization method in which a sufficiently small volume of the data is summarized, an online method in which a sufficiently smaller volume of the data is summarized, and a data maintenance method in which a process out of synchronization with the end user helps improve performance of the other methods. A bulk summarization method may be designed to maximize the use of system resources in order to tune the performance of the summarization process to handle large volumes of data. Similarly, an incremental method may be designed to minimize the use of system resources. Since the incremental method can seek to minimize the use of system resources, many different instances of the incremental method may run in parallel. Furthermore, an online method may be designed to use session specific tables such that as many sessions as resources allow may run in parallel. By formally separating the bulk, incremental, and online methods in a meaningful way, the architecture can provide for additional critical benefits such as data maintenance and reduced downtime. The formal separation of the bulk, incremental, and online methods may also remove the need for ad hoc code path splitting for bulk, incremental, and online data volumes. Any work that needs to be performed, but for which the end-user does not need to wait, may be performed by the data maintenance method of the summarization program when appropriate, such as immediately, at a deferred time, or some point in the future.

Figure 8:
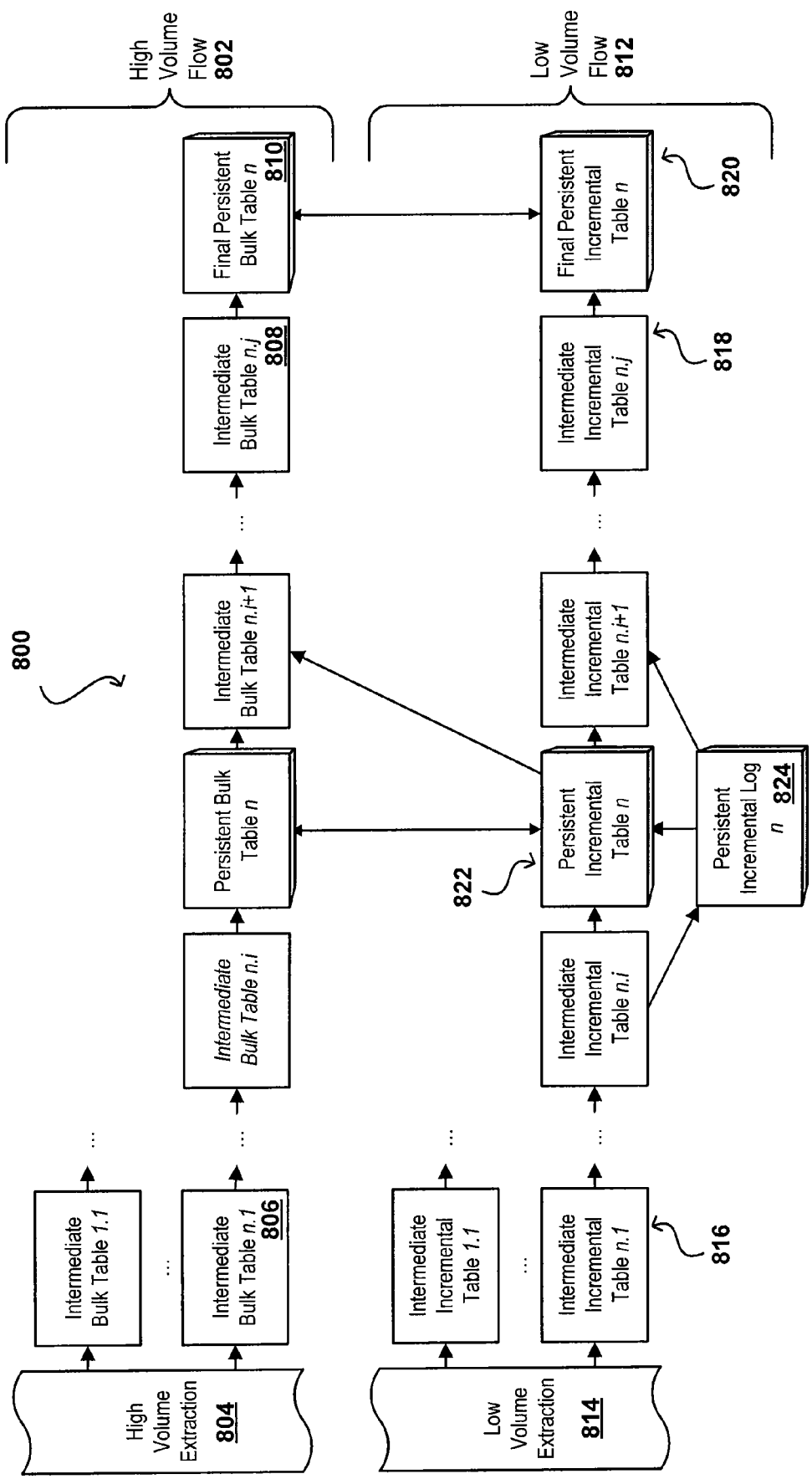
FIG. 8 illustrates an exemplary method for summarizing data that can be used in accordance with one embodiment of the present invention.

FIG. 8 illustrates an overview of exemplary flows in a summarization program 800 in accordance with one embodiment. Data in this example can be extracted and summarized using what is referred to herein as a concurrent request. For the purposes of clarity, a single "flow" 800 is shown in FIG. 8, which consists of a high volume flow portion 802 for a bulk method and a low volume flow portion 812 for an incremental method. The high volume flow moves data from a "High Volume" extraction 804 through various intermediate and persistent bulk tables 806, 808, and finally to "Final" Persistent Bulk Table n 810. The low volume flow moves data for a "Low Volume" extraction 814, through various intermediate and persistent incremental tables 816, 818, 822, 824, and finally to "Final" Persistent Incremental Table n 820. To simplify the illustration, the online method is not shown since it can behave the same as the incremental method except that it can use session specific tables for its intermediate tables. As can be seen, both the high and low volume flows have corresponding "persistent" tables, such as tables 822, 810, and 820, which enable the high volume flow and low volume flow to interact with each other wherever data is persisted. The low volume flow also is shown to use a Persistent Incremental Log. Other than the log table, there can be a one-to-one correspondence between tables in the high volume flow and tables in the low volume flow, as the data transformations in the flow portions correspond to the same business needs. This is also why the high and low volume flows, taken together, are considered to be a single flow in this example. Although a single, simplified flow is shown in FIG. 8, it should be appreciated that there may be any number of flows. Furthermore, the multiplicity of flows need not be independent from each other and may contribute data to each other in any way as long as the properties defined herein hold. Between the extraction and the final persistent tables, there may be any number of persistent tables as long as the properties defined herein hold. Because the data may be persisted at various points in the summarization flow, the summarization flow need not continue after any of such points and may be run at a later time to bring the data from the persistent tables at one point to another point with persistent tables. Any flow can interact with any other flow in any appropriate way, as long as the rules of interaction between the corresponding persistent tables remain.

By formally separating the high volume flow, the low volume flow, and the lower volume flow portions (for bulk, incremental, and online methods, respectively), the summarization methods are free to take advantage of various performance tuning techniques and architectures. Bulk operations may be performed on bulk tables, multiple parallel incremental operations may be performed on incremental tables, and as many parallel online operations as resources allow may be performed on session specific tables.

Similar to extraction methods, business needs and system resources dictate the method(s) used for summarization. Limited system resources could cause a restriction on the volume of data that may be summarized, which would result in the use of frequent incremental summarization runs. In contrast, a business need may require minimal usage of resources at certain times (for example, when users are on the system) and then to summarize all data during off hours, which would cause a need for a bulk summarization approach and periodic incremental summarization runs. Many other business needs exist that would require various configurations of summarization.

Figure 9:
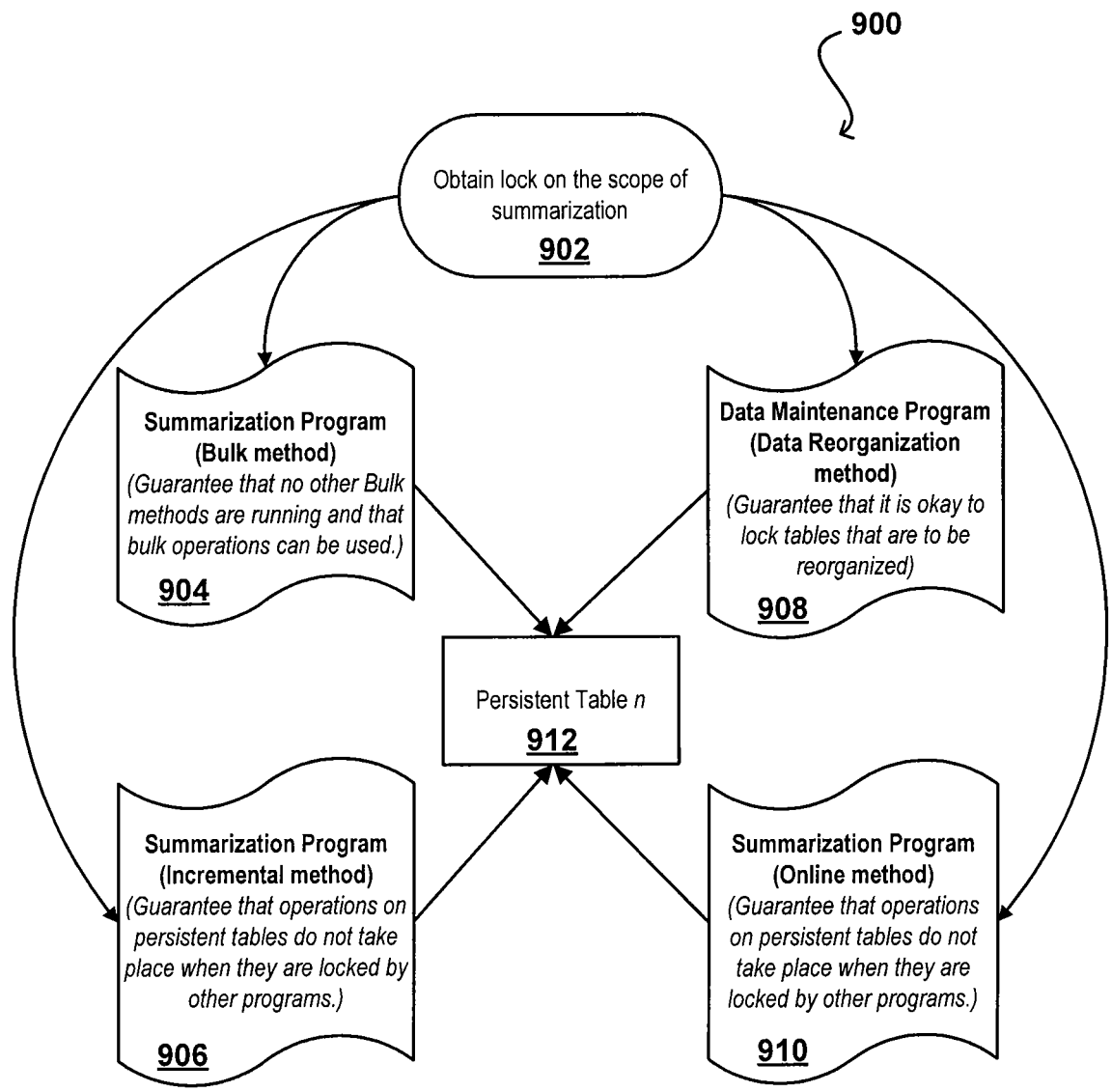
FIG. 9 illustrates an exemplary method for summarizing data that can be used in accordance with one embodiment of the present invention.

FIG. 9 illustrates an overview 900 of interacting summarization methods in accordance with one embodiment. As discussed above, two methods, and more strictly two different runs of the summarization program, may not concurrently operate on the same row of data in a persistent table Thus, a summarization program or other such application in this embodiment first obtains a lock on the right to summarize at least some of the data in a persistent table n 912. This lock can be obtained using any appropriate locking mechanism 902 known in the art for such purposes.

For the different summarization methods to work together, the methods in one embodiment are able to guarantee that the methods can summarize data in their own way without interfering with the other methods of summarization. For example, the bulk method 904 is able to guarantee that no other summarization programs using the bulk method are running, and that locking persistent tables 912 in order to append data does not cause any other summarization method to fail. An incremental method 906 or an online method 910 is able to guarantee that operations that lock entire persistent tables do not cause any operations or methods to fail. A data maintenance method 908, besides the end-user controlled notion of being run or scheduled at specific times in order to minimize the affects on other end-users, is able to guarantee that locking persistent tables in order to append data does not cause any other summarization method to fail. Additional methods of summarization could similarly guarantee that they could summarize data in their own way.

Figure 10:
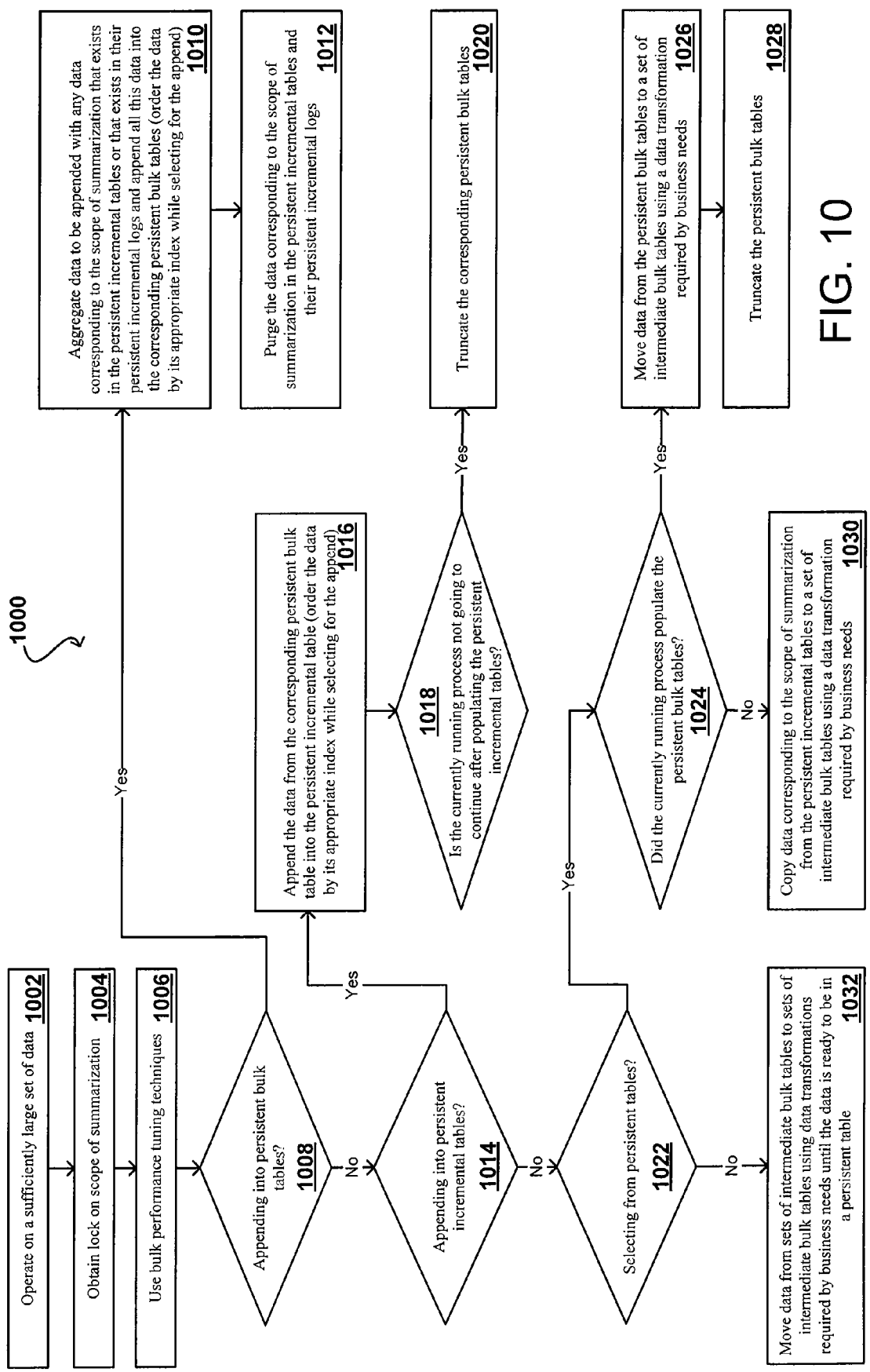
FIGS. 10-12 illustrate exemplary methods for summarizing data that can be used in accordance with one embodiment of the present invention.
Figure 11:
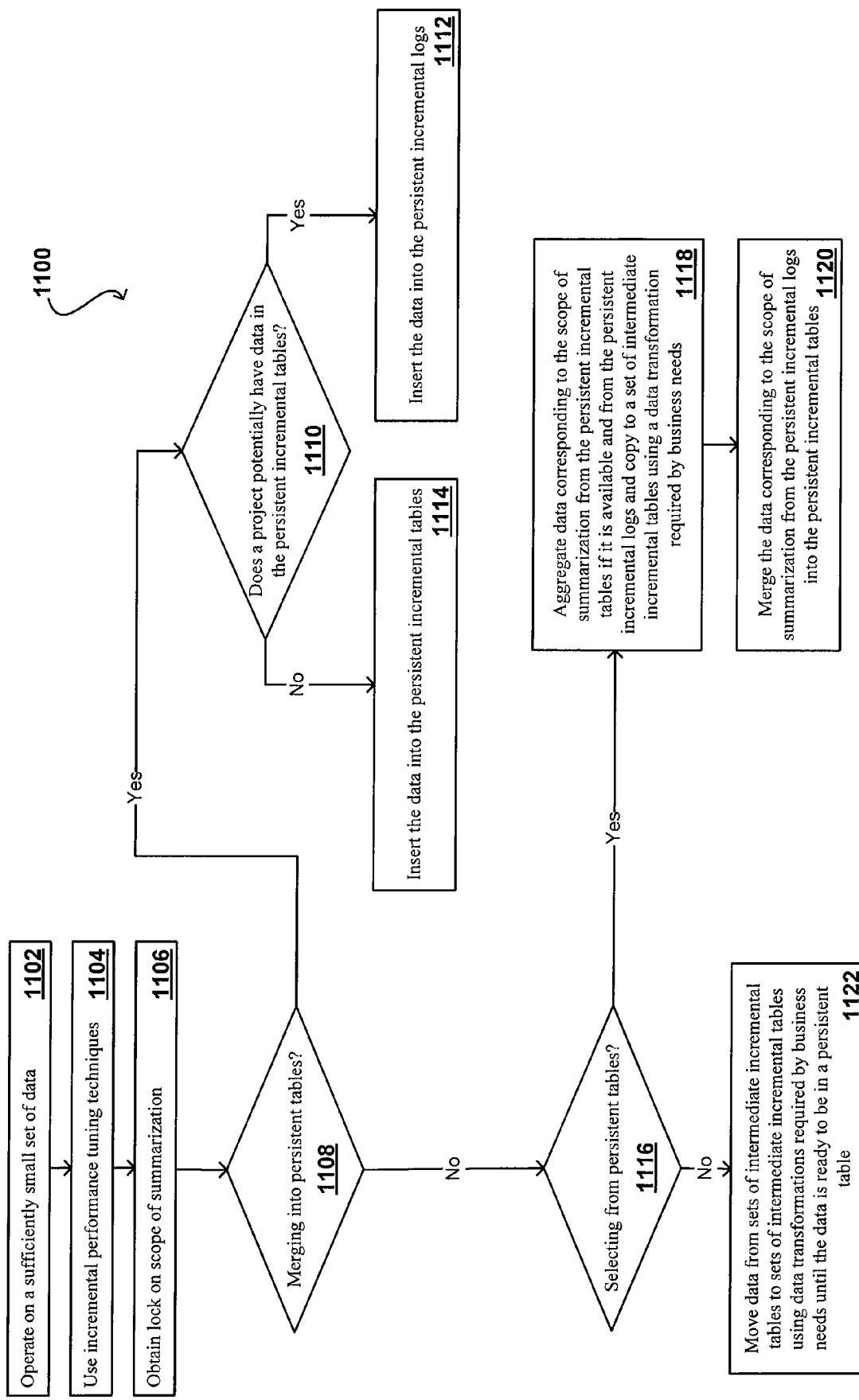
Figure 12:
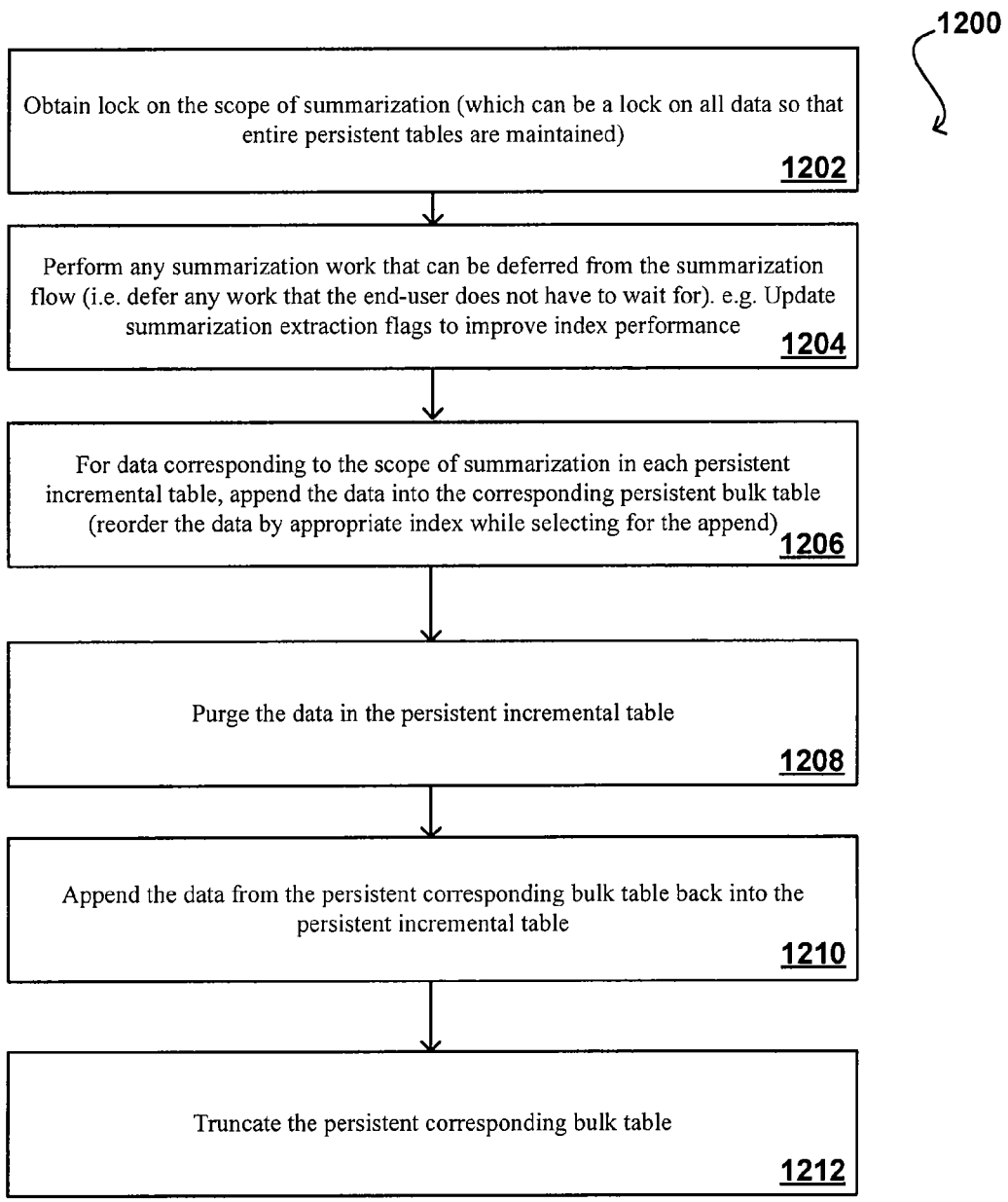

FIGS. 10-12 illustrate exemplary summarization methods that can interact in accordance with one embodiment. As discussed above, a single overall flow can be considered to have a high volume portion, corresponding to a bulk summarization method, and a low volume flow portion, corresponding to incremental or online summarization methods. FIG. 10 illustrates a high flow portion 1000 corresponding to a bulk method. In this example, it is ensured that the bulk summarization method is operating on a sufficiently large set of data 1002, then a lock is obtained on the scope of summarization 1004 and bulk performance tuning techniques are used as appropriate 1006. For each movement of data between tables, a determination is made as to whether the method is appending to persistent bulk tables 1008, and if so then the data to be appended is aggregated with any data corresponding to the scope of summarization that exists in the persistent incremental tables or that exists in their persistent incremental logs, and all this data is appended into the corresponding persistent bulk tables (the data being ordered by the appropriate index while selecting for the append) 1010. The data corresponding to the scope of summarization in the persistent incremental tables and their persistent incremental logs is then purged 1012. In the case that a project being summarized by the bulk method had previously been summarized by the online extraction method and the online extraction method only extracts data corresponding to events, then the data in the persistent incremental tables and logs would be purged and would not be selected for the append. This allows the user of the summarization program to begin transacting and running the online method without ever needing to run the bulk method, which can then be run when desired.

If it was determined that the data is not being appended to persistent bulk tables, a decision is made as to whether the data is being appended to persistent incremental tables 1014. If so, the data from the corresponding persistent bulk table is appended into the persistent incremental table (with the data being ordered by its appropriate index while selecting for the append) 1016. If the currently running process will not continue after the persistent incremental tables are populated 1018, then the corresponding persistent bulk tables are truncated 1020. If data is not being appended to either, then if the method is not selecting from persistent tables 1022 then data from sets of intermediate bulk tables are moved to sets of intermediate bulk tables using data transformations required by business needs until the data is ready to be in a persistent table 1032. If the method is instead selecting from persistent tables 1022, then if the currently running process did not populate the persistent bulk tables 1024, data corresponding to the scope of summarization is copied from the persistent incremental tables to a set of intermediate bulk tables using a data transformation required by business needs 1030. If the current process populated the persistent bulk tables, data from the persistent bulk tables is moved to a set of intermediate bulk tables using a data transformation required by business needs 1026 and the persistent bulk tables are truncated 1028.

FIG. 11 illustrates a low flow portion 1100 corresponding to an incremental or online method. In this example, it is ensured that the incremental summarization method is operating on a sufficiently small set of data 1102. If so, incremental performance tuning techniques are used as appropriate 1104 and a lock is obtained on the scope of summarization 1106. For each movement of data between tables, a determination is made as to whether the method is merging into persistent tables 1108, and if so then a determination is made as to whether a project potentially has data in the persistent incremental tables 1110. If so, the data is inserted into the persistent incremental logs 1112, and if not then the data is inserted into the persistent incremental tables 1114. If data is not merged into persistent tables 1108, a determination is made as to whether the method is selecting from persistent tables 1116. If not, data from sets of intermediate incremental tables are moved to sets of intermediate incremental tables using data transformation required by business needs until the data is ready to be in a persistent table 1122. If data is being selected from persistent tables 1116, then data corresponding to the persistent incremental tables is aggregated if it is available and from the persistent logs, and copied to a set of intermediate incremental tables using a data transformation required by business needs 1118. Data corresponding to the scope of summarization is merged from the persistent incremental logs into the persistent incremental tables 1120.

FIG. 12 illustrates an exemplary data maintenance method 1200 that can include operations between persistent tables, such as is shown in FIG. 8. In the method, a lock is obtained on the scope of summarization, which can be a lock an all data so that entire persistent tables are maintained 1202, but can also be a lock on any subset of the data. Any summarization work that can be deferred from the summarization flow is performed, deferring any work that an end-user does not have to wait for, for example, any summarization extraction flags can be updated to improve index performance 1204, or any old summarization events can be deleted. For data corresponding to the scope of summarization in each persistent incremental table, the data is appended into the corresponding persistent bulk table, reordering the data by its appropriate index while selecting for the append 1206. Data in the persistent incremental table is purged 1208, and data from the persistent corresponding bulk table is appended back into the persistent incremental table 1210. The corresponding persistent bulk table is then truncated as appropriate 1212. The data maintenance program can perform any subset of its deferred tasks as determined by summarization parameters.

Due to the complexity of a summarization implementation, it may become necessary to truncate all summarization data and to start from scratch. In this case, end-users may be subjected to a protracted downtime. However, because of the architecture described herein, the bulk summarization process may be run without immediately affecting data in the incremental fact, thereby bringing the system downtime close to the time it takes to truncate the persistent incremental tables and reinsert the data from the corresponding persistent bulk tables.

Figure 13:
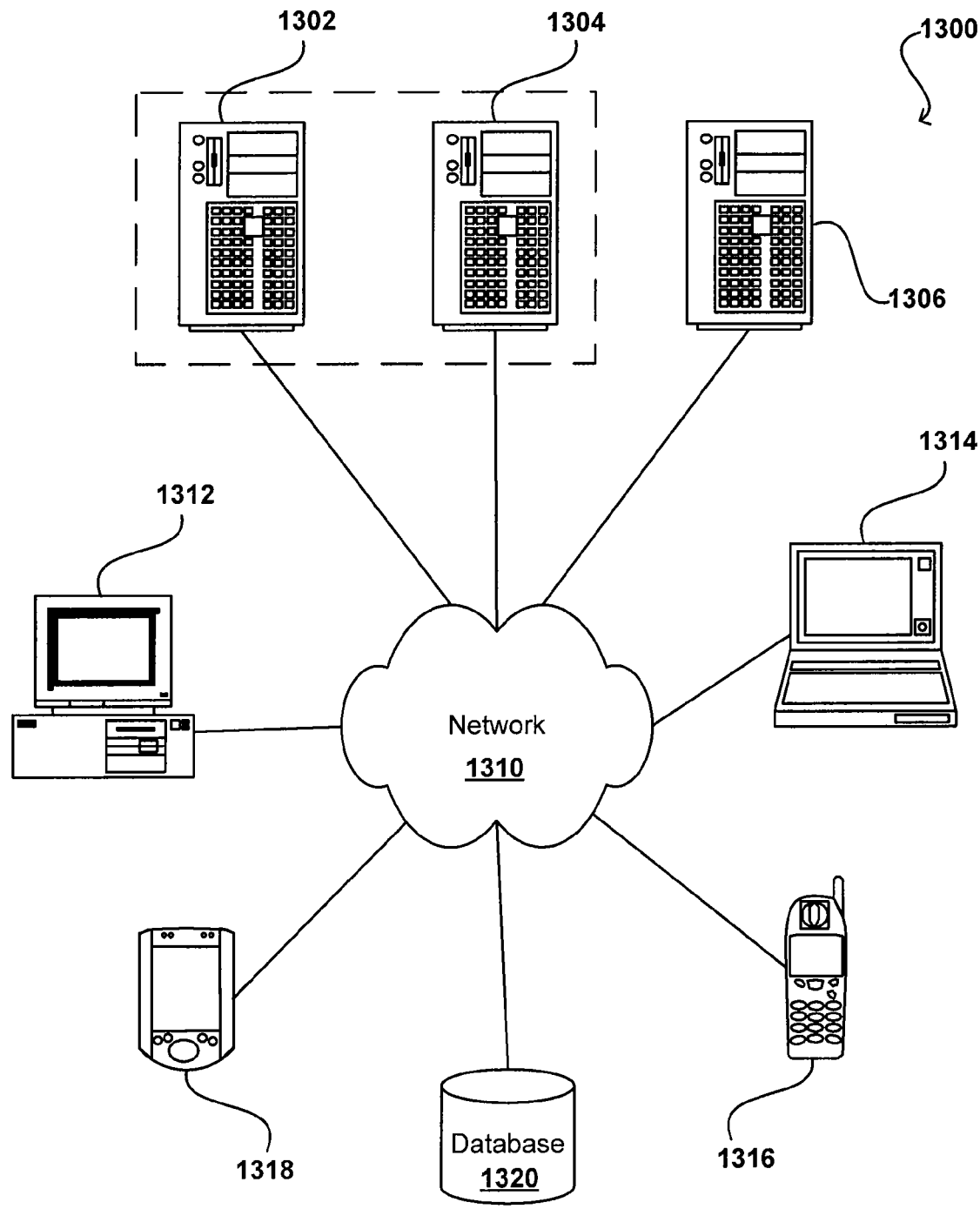
FIG. 13 illustrates components of a computer network that can be used in accordance with one embodiment of the present invention.

Operating Environment:

FIG. 13 is a block diagram illustrating components of an exemplary operating environment in which various embodiments of the present invention may be implemented. The system 1300 can include one or more user computers, computing devices, or processing devices 1312, 1314, 1316, 1318, which can be used to operate a client, such as a dedicated application, web browser, etc. The user computers 1312, 1314, 1316, 1318 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1312, 1314, 1316, 1318 may also have any of a variety of applications, including one or more development systems, database client and/or server applications, and Web browser applications. Alternatively, the user computers 1312, 1314, 1316, 1318 may be any other electronic device, such as a thin-client computer, Internet-enabled gaming system, and/or personal messaging device, capable of communicating via a network (e.g., the network 1310 described below) and/or displaying and navigating Web pages or other types of electronic documents. Although the exemplary system 1300 is shown with four user computers, any number of user computers may be supported.

In most embodiments, the system 1300 includes some type of network 1310. The network may can be any type of network familiar to those skilled in the art that can support data communications using any of a variety of commercially-available protocols, including without limitation TCP/IP, SNA, IPX, AppleTalk, and the like. Merely by way of example, the network 1310 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1302, 1304, 1306 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1306) may be dedicated to running applications, such as a business application, a Web server, application server, etc. Such servers may be used to process requests from user computers 1312, 1314, 1316, 1318. The applications can also include any number of applications for controlling access to resources of the servers 1302, 1304, 1306.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1312, 1314, 1316, 1318. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1312, 1314, 1316, 1318.

The system 1300 may also include one or more databases 1320. The database(s) 1320 may reside in a variety of locations. By way of example, a database 1320 may reside on a storage medium local to (and/or resident in) one or more of the computers 1302, 1304, 1306, 1312, 1314, 1316, 1318. Alternatively, it may be remote from any or all of the computers 1302, 1304, 1306, 1312, 1314, 1316, 1318, and/or in communication (e.g., via the network 1310) with one or more of these. In a particular set of embodiments, the database 1320 may reside in a storage-area network ("SAN") familiar to those skilled in the art. Similarly, any necessary files for performing the functions attributed to the computers 1302, 1304, 1306, 1312, 1314, 1316, 1318 may be stored locally on the respective computer and/or remotely, as appropriate. In one set of embodiments, the database 1320 may be a relational database, such as Oracle 10g, that is adapted to store, update, and retrieve data in response to SQL-formatted commands.

Figure 14:
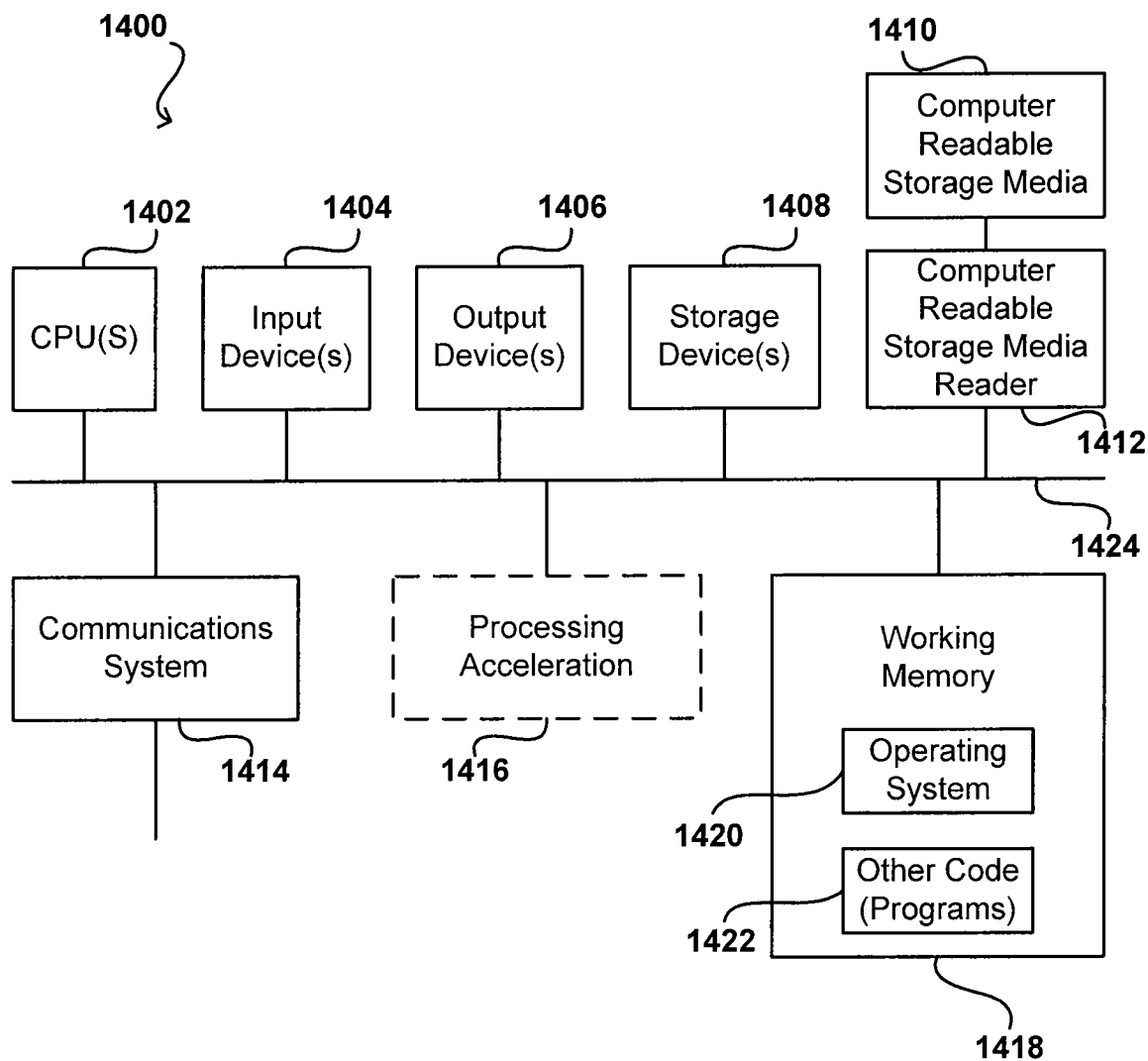
FIG. 14 illustrates components of a computerized device that can be used in accordance with one embodiment of the present invention.

FIG. 14 illustrates an exemplary computer system 1400, in which various embodiments of the present invention may be implemented. The system 1400 may be used to implement any of the computer systems described above. The computer system 1400 is shown comprising hardware elements that may be electrically coupled via a bus 1424. The hardware elements may include one or more central processing units (CPUs) 1402, one or more input devices 1404 (e.g., a mouse, a keyboard, etc.), and one or more output devices 1406 (e.g., a display device, a printer, etc.). The computer system 1400 may also include one or more storage devices 1408. By way of example, the storage device(s) 1408 can include devices such as disk drives, optical storage devices, solid-state storage device such as a random access memory ("RAM") and/or a read-only memory ("ROM"), which can be programmable, flash-updateable and/or the like.

The computer system 1400 may additionally include a computer-readable storage media reader 1412, a communications system 1414 (e.g., a modem, a network card (wireless or wired), an infra-red communication device, etc.), and working memory 1418, which may include RAM and ROM devices as described above. In some embodiments, the computer system 1400 may also include a processing acceleration unit 1416, which can include a digital signal processor DSP, a special-purpose processor, and/or the like.

The computer-readable storage media reader 1412 can further be connected to a computer-readable storage medium 1410, together (and, optionally, in combination with storage device(s) 1408) comprehensively representing remote, local, fixed, and/or removable storage devices plus storage media for temporarily and/or more permanently containing, storing, transmitting, and retrieving computer-readable information. The communications system 1414 may permit data to be exchanged with the network and/or any other computer described above with respect to the system 1400.

The computer system 1400 may also comprise software elements, shown as being currently located within a working memory 1418, including an operating system 1420 and/or other code 1422, such as an application program (which may be a client application, Web browser, mid-tier application, RDBMS, etc.). It should be appreciated that alternate embodiments of a computer system 1400 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for extracting data from a source table using at least one of a plurality of different extraction methods on the same source table, the method comprising:
   determining, by a computer system, a volume of data within a scope of extraction in response to receiving a request to extract data from the source table, each record in the source table including a summary identifier, the scope of extraction including a set of the summary identifiers in the source table, each summary identifier corresponding to a data event;
   determining, by the computer system, at least one extraction method from the plurality of different extraction methods, wherein each of the plurality of extraction methods provide dynamic extraction of different volumes of data from the source table and wherein determining the at least one extraction method is based at least in part upon the determined volume of data within the scope of extraction;
   obtaining, by the computer system, a lock on data in the source table within the determined scope of extraction;
   extracting, by the computer system, the data from the source table within the determined scope of extraction using the determined at least one extraction method; and
   preserving, by the computer system, a context in the source table by setting the summary identifier for each record of extracted data to a predetermined value indicating that the record has been extracted thereby reducing a user's wait time for updating the system summary identifier, wherein the predetermined value is based in part on the scope of the extraction.

2. A method according to claim 1, wherein:
   the extraction method is selected from a group consisting of bulk methods, incremental methods, online methods, and re-extraction methods.

3. A method according to claim 1, further comprising:
   recording, by the computer system, a high water mark indicating which records of data have previously been extracted.

4. A method according to claim 3, wherein:
   the summary identifier for each record is an integer or a null value, and
   the high water mark is a next integer value in sequence from a last extracted summary identifier.

5. A method according to claim 1, further comprising:
   storing, by the computer system, information for each data event in an event table.

6. A method according to claim 5, further comprising:
   summarizing, by the computer system, the extracted data.

7. A method according to claim 6, further comprising:
   deleting, by the computer system when appropriate, an event from the event table when data in the source table that corresponds to the event is summarized.

8. A method according to claim 6, further comprising:
   marking, by the computer system, an event in the event table when data in the source table that corresponds to the event is summarized.

9. A method according to claim 1, further comprising:
   allowing, by the computer system, at least one additional extraction method to obtain a lock on data in the source table within a separate, non-overlapping scope of extraction.

10. A system for extracting data from a source table, comprising:
    a processor; and
    a memory device including instructions that, when executed by the processor, cause the processor to:
       determine a volume of data within a scope of extraction in response to receiving a request to extract data from the source table, each record in the source table including a summary identifier, the scope of extraction including a set of the summary identifiers in the source table, each summary identifier corresponding to a data event;
       determine at least one extraction method from a plurality of different extraction methods, wherein each of the plurality of extraction methods provide dynamic extraction of different volumes of data from the source table and wherein determining the at least one extraction method is based at least in part upon the determined volume of data within the scope of extraction;
       obtain a lock on data in the source table within the determined scope of extraction;
       extract the data from the source table within the determined scope of extraction using the determined at least one extraction method; and
       preserve a context in the source table by setting the summary identifier for each record of extracted data to a predetermined value indicating that the record has been extracted thereby reducing a user's wait time for updating the system summary identifier, wherein the predetermined value is based in part on the scope of the extraction.

11. A system according to claim 10, wherein:
the extraction method is selected from a group consisting of bulk methods, incremental methods, online methods, and re-extraction methods.

12. A system according to claim 10, wherein the memory device further includes instructions that, when executed by the processor, cause the processor to:
store information for each data event in an event table;
summarize the extracted data;
delete, when appropriate, an event from the event table when data in the source table that corresponds to the event is summarized.

13. A non-transitory computer readable storage medium having sets of instructions for extracting data from a source table stored thereon which, when executed by a computer, cause the computer:
determine a volume of data within a scope of extraction in response to receiving a request to extract data from the source table, each record in the source table including a summary identifier, the scope of extraction including a set of the summary identifiers in the source table, each summary identifier corresponding to a data event;
determine at least one extraction method from a plurality of different extraction methods, wherein each of the plurality of extraction methods provide dynamic extraction of different volumes of data from the source table and wherein determining the at least one extraction method is based at least in part upon the determined volume of data within the scope of extraction;
obtain a lock on data in the source table within the determined scope of extraction;
extract the data from the source table within the determined scope of extraction using the determined at least one extraction method; and
preserve a context in the source table by setting the summary identifier for each record of extracted data to a predetermined value indicating that the record has been extracted thereby reducing a user's wait time for updating the system summary identifier, wherein the predetermined value is based in part on the scope of the extraction.

14. A non-transitory computer readable medium according to claim 13, wherein:
the extraction method is selected from a group consisting of bulk methods, incremental methods, online methods, and re-extraction methods.

15. A non-transitory computer readable medium according to claim 13, wherein the sets of instructions when further executed by the computer, cause the computer to:
store information for each data event in an event table;
summarize the extracted data;
delete, when appropriate, an event from the event table when data in the source table that corresponds to the event is summarized.

* * * * *

UNITED STATES PATENT AND TRADEMARK OFFICE
CERTIFICATE OF CORRECTION

PATENT NO.        : 8,600,990 B2                                    Page 1 of 1
APPLICATION NO.   : 12/059811
DATED             : December 3, 2013
INVENTOR(S)       : Vermette et al.

It is certified that error appears in the above-identified patent and that said Letters Patent is hereby corrected as shown below:

In the Specification

In column 13, line 31, delete "may can" and insert -- may --, therefor.

Signed and Sealed this
Tenth Day of June, 2014

Michelle K. Lee
*Deputy Director of the United States Patent and Trademark Office*